United States Patent [19]

Paskus

[11] Patent Number: 5,346,042
[45] Date of Patent: Sep. 13, 1994

[54] VALVE FOR SETTING THE DAMPENING LEVEL OF SUSPENSION STRUTS

[75] Inventor: Linas A. Paskus, Peoria, Ill.

[73] Assignee: Dresser Industries, Inc., Dallas, Tex.

[21] Appl. No.: 38,161

[22] Filed: Mar. 26, 1993

[51] Int. Cl.⁵ ............................................. F16F 9/34
[52] U.S. Cl. ............................... 188/322.13; 188/282
[58] Field of Search .............. 188/282, 285, 287, 319, 188/322.13, 322.15; 267/64.18, 64.22, 64.28, 64.26

[56] References Cited

U.S. PATENT DOCUMENTS

| | | | |
|---|---|---|---|
| 656,232 | 8/1900 | Westinghouse | 188/107 |
| 1,506,711 | 8/1924 | Chase | 188/287 |
| 2,213,823 | 9/1940 | Renfer | 188/322.13 |
| 2,397,640 | 4/1946 | Bingham | 188/317 |
| 2,440,353 | 4/1948 | Wallace | 267/64.22 |
| 2,767,978 | 10/1956 | Keefer | 267/64.22 |
| 2,929,471 | 3/1960 | Schnitzer | 188/298 |
| 3,419,114 | 12/1968 | Rumsey | 188/280 |
| 3,531,065 | 9/1970 | Brown | 188/287 |
| 3,621,950 | 11/1971 | Lutz | 188/315 |
| 4,262,779 | 4/1981 | Katsumori et al. | 188/315 |
| 4,765,446 | 8/1988 | Murata et al. | 188/322.15 |
| 4,880,086 | 11/1989 | Knecht et al. | |

Primary Examiner—Robert J. Oberleitner
Assistant Examiner—Chris Schwartz
Attorney, Agent, or Firm—Arnold White & Durkee

[57] ABSTRACT

A valve for setting the dampening level of a fluidic suspension strut is disclosed herein. The valve is especially suited for use within suspension struts of the kind having a cylinder, a telescopically interfitted piston, and an annulus between the cylinder and the interfitted piston. The valve includes a valve body, a valve stem, a housing, and a pressure sensing assembly. The valve responds to steady-state, load-induced pressure variations in the piston to regulate the flow of the fluid and the resulting damping characteristics of the strut.

28 Claims, 3 Drawing Sheets

VALVE FOR SETTING THE DAMPENING LEVEL OF SUSPENSION STRUTS

BACKGROUND OF THE INVENTION

1. Field of the Invention

The present invention relates generally to improvements in suspension struts. More specifically, the invention relates to a valve that adjusts the dampening level of fluidic suspension struts to match the response of the strut to its level of steady-state loading.

2. Description of Related Art

Off-highway trucks are heavy duty, earth-moving vehicles that are typically used in mining operations or in other operations requiring the movement of large quantities of earth or other materials. Not surprisingly, the more efficiently these trucks move earth, the more profitable the operations. Many factors are taken into account to design these off-highway trucks for their intended use.

In a typical work cycle, an off-highway truck will position itself near a loading vehicle, such as a bucket loader or a power shovel. The loading vehicle fully loads the truck with material. The truck then hauls the material to a dumping site, which may be several miles away from the loading site. After the truck dumps the material at the dumping site, it returns to the loading site to pick up another load. It is clear that the efficiency of a truck increases as its cycle time decreases.

To increase efficiency, the speed, handling, and driver comfort of the truck must be improved. Off-highway dump trucks typically haul about 1.4 times their empty weight. Therefore, a truck with an empty weight of 350,000 lbs. would be capable of hauling about 240 tons of material. Off-highway trucks may be over 20 feet wide, 40 feet long, and 20 feet high. Although a vehicle of this size and weight is slow and handles poorly as compared with on-highway trucks, it is nonetheless important to maximize its speed and handling capabilities to minimize its cycle time.

Many factors limit the speed and handling capability of off-highway trucks. The suspension design is one of these factors. Typically, fluidic struts are used in the suspension system. These struts are typically filled with gas, which acts as a spring, and oil, which acts as a damper. Due to the enormous load carried by these struts, they must be highly charged to support the weight of a fully loaded truck. The dampening level of a typical strut is regulated by a fixed orifice that is sized as a compromise between the optimum size for an empty truck and the optimum size for a loaded truck. Therefore, when the truck is empty, its suspension tends to be overdamped resulting in a stiff ride and undesirable handling characteristics. This causes driver fatigue and increases the stress experienced by the truck's components, such as the frame, suspension and tires. When the truck is loaded, the suspension tends to be underdamped resulting in extensive low frequency loping. This also causes driver discomfort and results in reduced component life.

The present invention is directed to overcoming, or at least minimizing, one or more of the disadvantages set forth above.

SUMMARY OF THE INVENTION

In accordance with one aspect of the present invention, a valve is provided for setting the dampening level of a fluid-filled strut. The strut includes a cylinder and a piston. The piston is slidably disposed for axial movement within the cylinder and forms an annulus therebetween. The piston has an interior chamber and a passageway fluidically coupling fluid in the interior chamber to fluid in the annulus.

The valve includes a valve body having a first end portion and a second end portion, and having an orifice between the first end portion and the second end portion. The first end portion is configured to be coupled to the passageway of the piston. The second end portion has a housing portion. The housing portion has a port that fluidically couples an interior region of the housing portion with the interior chamber of the piston. A valve stem is disposed within the valve body proximate the orifice. The valve stem is movable between a first position in which the valve stem covers the orifice and a second position in which the valve stem uncovers the orifice. A pressure sensing assembly is disposed in the housing portion and positioned in cooperating relationship to the valve stem. The pressure sensing assembly cause movement of the valve stem toward the first position in response to fluid pressure in the interior region of the housing moving the pressure sensing assembly in a first direction.

BRIEF DESCRIPTION OF THE DRAWINGS

The foregoing and other advantages of the invention will become apparent upon reading the following detailed description and upon reference to the drawings in which.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives following within the spirit and scope of the invention as defined by the appended claims.

DESCRIPTION OF PREFERRED EMBODIMENTS

Figure 1:
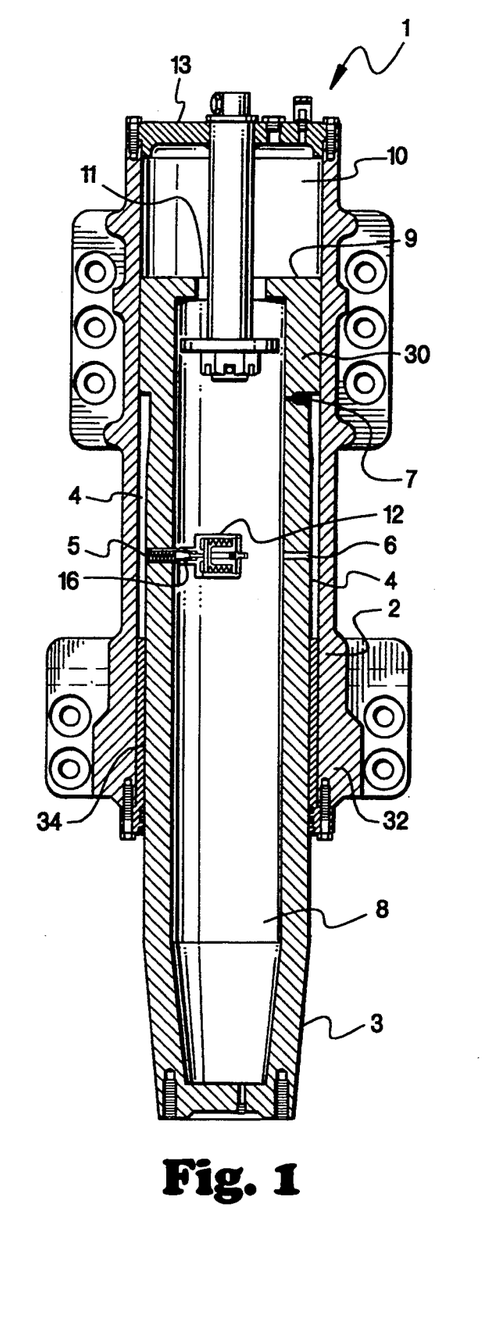
FIG. 1 illustrates a cross-sectional side view of a fluidic suspension strut in a typical steady state position for an empty truck, where the strut includes a preferred embodiment of a valve for setting the dampening level of the strut.
Figure 2:
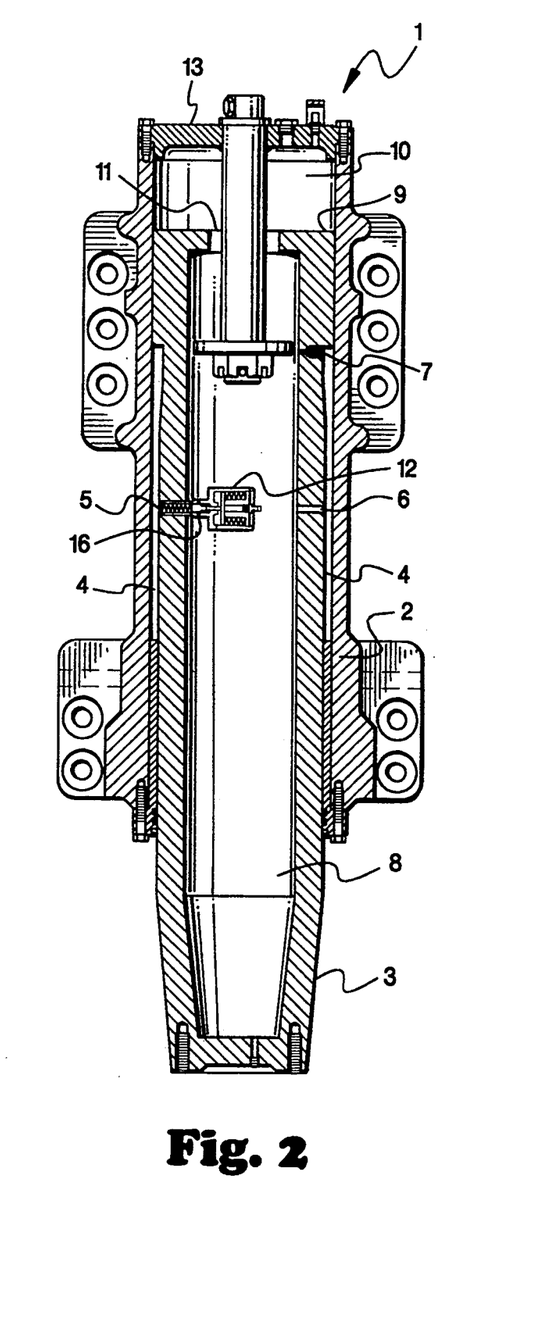
FIG. 2 illustrates a cross-sectional side view of the strut illustrated in FIG. 1 in a typical steady state position for a loaded truck.

Referring to FIGS. 1 and 2, a preferred embodiment of a suspension strut is illustrated and generally designated by a reference numeral 1. The strut 1 includes a cylinder 2 that has a hollow piston 3 telescopically interfitted and slidably mounted within it. The hollow portion of the piston 3 forms an interior chamber 8. An annulus 4 is formed between the cylinder 2 and the piston 3. The inner end 9 of the piston 3 includes a slidable seal 30 that encloses and defines a one end of the annulus 4 and of a chamber 10. The end 32 of the cylinder 2 also includes a seal 34 that defines the other end of the annulus 4. The volumes of the annulus 4, the interior chamber 8, and the chamber 10 change as the piston 3 slides axially within the cylinder 2.

The cylinder 2, the piston 3, and the annulus 4 are filled with fluid (not shown). The interior chamber 8 and the annulus 4 are filled with a non-compressible fluid, such as oil. The lower portion of the chamber 10 is also filled with the non-compressible fluid, but the upper portion is preferably filled with gas, such as nitrogen. The gas acts as a spring, and the oil acts as a damper. A passageway 5, a secondary throttling conduit 6, and a one-way check valve 7 fluidically couple the annulus 4 with the interior chamber 8 of the piston 3. The chamber 10 is fluidically coupled to the interior chamber 8 by a passageway 11.

The manner in which the volumes of the above-mentioned volumes change and their pressure differentials determine the dampening characteristics of the strut 1. FIGS. 1 and 2 illustrate typical steady state positions (for an empty and loaded truck, respectively,) of the fluidic suspension strut 1 which incorporates a valve 12 for setting the dampening level of the strut 1. The valve 12 sets the dampening level of the strut 1 to one of two levels, one level for an empty truck and another level for a loaded truck. When the piston 3 moves relative to the cylinder 2, a pressure differential between the annulus 4 and the interior chamber 8 is created by restricting oil flow between the annulus 4 and the chambers 8 and 10. The dampening rate is determined by this pressure difference acting upon the annulus's area. The valve 12 is mounted in the passageway 5 to control the pressure difference in the annulus's area by selectively permitting or preventing flow through the passageway 5.

Regardless of steady state loading conditions, dampening during strut compression is very low due to the operation of the check valve 7. During compression of the strut 1, the piston 3 moves upwardly toward the end 13 of the cylinder 2. Thus, the volume in the annulus 4 increases and the volume of the chamber 10 and of the piston's interior chamber 8 decreases. Oil flow is relatively free through the check valve 7 from the interior chamber 8 into the annulus 4 during compression, so the strut 1 exhibits little dampening during compression.

Dampening during strut extension varies with the truck's steady state load condition. When the truck is empty, the steady state load on the suspension strut 1 is low, so the internal strut pressure is low. In this state, the valve 12 is open to allow fluid to pass between the annulus 4 and the interior chamber 8 through the passageway 5 and secondary throttling conduit 6. Oil flow rate between the annulus 4 and the interior chamber 8 through the passageway 5 and secondary throttling conduit 6 is calibrated to result in desirable damping characteristics for an empty truck. The flow rate of fluid through the open valve can, by selecting the appropriate size and geometry of the orifice, tube, and passageway, be set at levels desirable for operation when the truck is empty.

When the truck is loaded, the steady state load on the suspension strut 1 is substantially higher, so the pressure of the fluid in the strut is higher. In this state, the valve 12 is closed to cut off oil flow between the annulus 4 and the interior chamber 8 through the passageway 5. Oil is now forced to flow through the secondary throttling conduit 6 exclusively. This results in increased dampening which is desirable during operation of a loaded truck.

Figure 3:
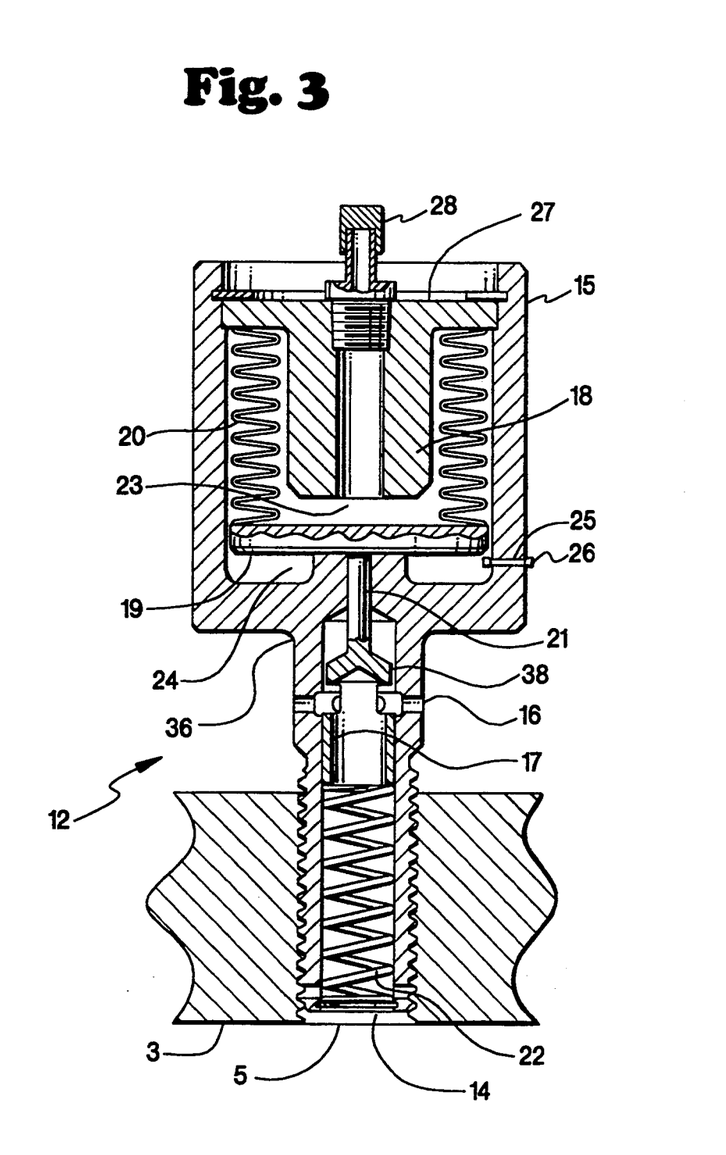
FIG. 3 illustrates a cross-sectional side view of a preferred embodiment of a valve for setting the dampening level of a strut in which the valve spool is situated in a position to open the valve.
Figure 4:
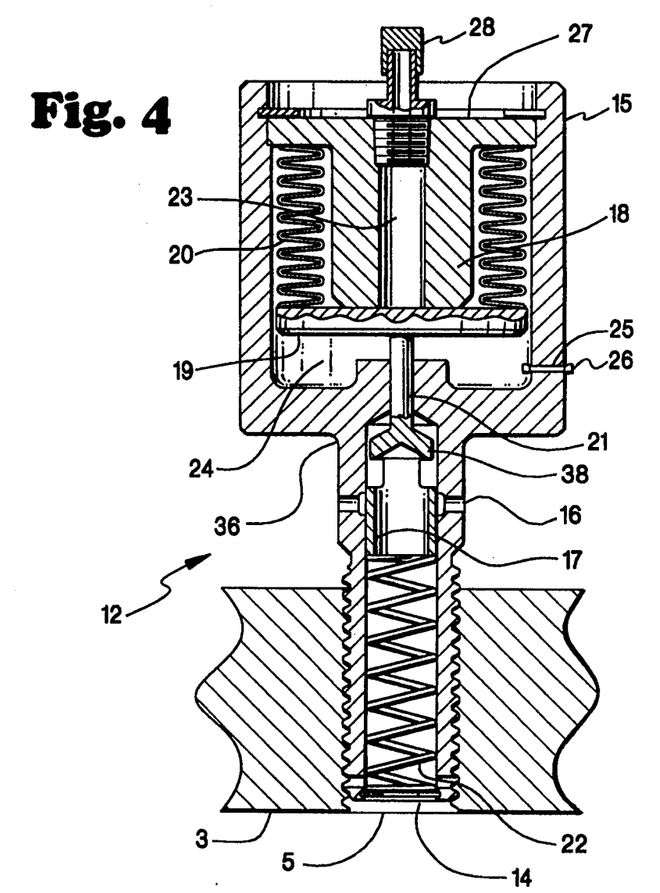
FIG. 4 illustrates the valve of FIG. 3 wherein its valve spool has been moved to another position to close the valve.

The valve 12 illustrated in FIGS. 3 and 4 includes a valve body 36 having a first end 14, a second end 15, and a radial orifice 16 between these ends. The first end 14 of the valve body 36 is configured so that it can be fitted into the passageway 5 of the piston 3. Preferably, the valve body 36 and the passageway 5 are threaded so that the valve body 36 may be screwed into the wall of the piston 3. A valve stem 38 having a valve spool 17 and a pin 21 is slidably mounted within the valve body 36 so that it is axially moveable between an open position (as illustrated in FIG. 3) and a closed position (as illustrated in FIG. 4).

The second end 15 of the valve body 36 includes a housing. A bellows assembly 18, which preferably includes a plate 19 and a biasing member 20, is mounted within the housing 15. The plate 19 is preferably sealed against the interior of the housing. The biasing member 20 preferably includes sealed metal bellows having a preselected spring rate. Movement of the plate 19 and biasing member 20 actuates the valve spool 17. This may be accomplished by coupling the pin 21 to the plate 19 so that the valve spool 17, the pin 21, and the plate 19 all move as one unit. However, the valve stem 38 is less susceptible to jamming if the pin 21 is kept in contact with the plate 19 by a return spring 22 that biases the valve stem 38 toward the plate 19. Thus, when fluid pressure causes the bellows assembly 18 to compress, as explained below, the return spring 22 causes the valve spool 17 to follow the plate 19 and to block the orifice 16 as shown in FIG. 4.

The combination of the plate 19 and the biasing member 20 separates the housing 15 into two pressure chambers, an inner chamber 23 and an outer chamber 24. The inner chamber 23 is precharged with a compressible fluid. As illustrated, the bellows termination 27 includes a closeable port 28 through which the pressure in the inner chamber 23 can be set at a preselected level. This level is chosen so that the bellows assembly 18 overcomes the force of-the spring 22, and the fluid pressure in the outer chamber 24, to bias the valve stem 38 into its open position when the truck is empty.

The outer chamber 24 is fluidically coupled to the surrounding interior chamber 8 of the piston 3 by a port 25. The port 25 is preferably fitted with a slidably mounted, elongated pin or conduit 26 that reduces port blockages that may be caused by the presence of contaminants in the dampening fluid. The port 25 is preferably configured to restrict oil flow so that the valve 12 does not respond to transient pressure fluctuations caused by suspension movement while the truck is traveling. Rather, it responds only to steady state pressure variations, i.e., prolonged pressure changes. Thus, as the payload of the truck increases during loading, the fluid pressure in the interior chamber 8 increases and causes the fluid pressure in the outer chamber 24 to increase. When the pressure in the outer chamber 24 overcomes the spring rate and precharge pressure of the bellows assembly 18, the bellows assembly 18 begins to compress. The return spring 22 causes the valve spool 17 and the pin 21 to follow the plate 19, thus closing the orifice 16. When the pressure in the strut 1 decreases as the truck dumps its payload, the bellows assembly 18 overcomes the force of the return spring 22 and forces the valve stem 38 away from the orifice 16 to open the valve 12.

Figure 5:
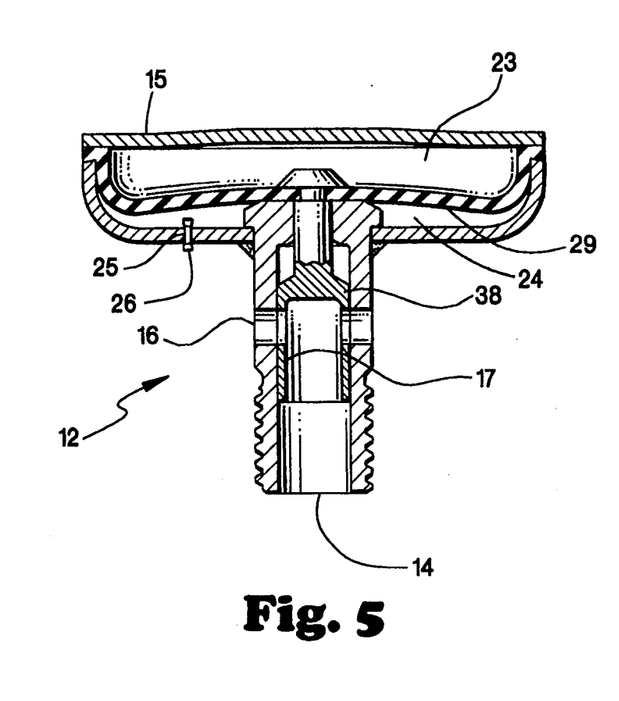
FIG. 5 illustrates a cross-sectional side view of an alternative preferred embodiment of a valve for setting the dampening level of a strut.

FIG. 5 illustrates an alternative embodiment of the present invention. Instead of using the bellows assembly 18 illustrated in FIG. 4, the alternative embodiment uses a pre-stressed, sealed, metal diaphragm 29. The diaphragm 29 serves the dual roles of the plate 19 and of the biasing member 20. The pressure sensitive surface of the diaphragm 29 flexes inwardly or outwardly in response to changes in fluid pressure inside the outer chamber 24. As illustrated, the pin 21 of the valve stem 38 is directly coupled to the diaphragm 29, so a return spring is not needed.

The valve disclosed and claimed herein minimizes the poor vibration dampening performance disadvantage of prior suspension struts. By providing the strut with a valve that regulates its vibration dampening characteristics as a function of the level of steady state load being applied to the strut, improved vibration dampening performance can now been achieved with a simple mechanical device. Furthermore, the valve may be fitted "in the field" to a truck's struts to improve the performance of the truck.

What is claimed is:

1. A valve setting the dampening level of a fluid-filled strut, said strut having a cylinder and having a piston, said piston being slidably disposed for axial movement within said cylinder and forming an annulus therebetween, said piston having an interior chamber and a passageway fluidically coupling fluid in said interior chamber to fluid in said annulus, said valve comprising:

a valve body having a first end portion and a second end portion, and having an orifice between said first end portion and said second end portion, said first end portion being positioned in said passageway of said piston and said second end portion having a housing portion positioned in said interior chamber of said piston, said housing portion having a port that fluidically couples an interior region of said housing portion with said interior chamber of said piston;

a valve stem disposed within said valve body proximate said orifice, said valve stem being movable between a first position in which said valve stem covers said orifice and a second position in which said valve stem uncovers said orifice; and pressure sensing assembly disposed in said housing portion and positioned in cooperating relationship to said valve stem, said pressure sensing assembly controlling the movement of said valve stem toward said first position in response to fluid pressure in said interior region of said housing moving said pressure sensing assembly in a first direction.

2. The valve, as set forth in claim 1, wherein said port is configured to filter transient pressure fluctuations and to transmit steady-state pressure fluctuations originating in said interior chamber of said piston.

3. The valve, as recited in claim 1, wherein said port has an elongated conduit slidably mounted therein, said conduit being movable in response to the direction of fluid flow into or out of said interior region for reducing port blockages caused by contaminants in the fluid.

4. The valve, as set forth in claim 1, further comprising:

a spring being disposed in said valve body in contact with said valve stem, said spring biasing said valve stem toward said first position.

5. The valve, as set forth in claim 4, wherein said pressure sensing assembly comprises:

a biasing member contacting said valve stem and biasing said valve stem toward said second position wherein said biasing member forces said valve stem into said second position against the bias of said spring until fluid pressure in said interior region of said housing moves said biasing member in said first direction so that said spring forces said valve stem into said first position.

6. The valve, as set forth in claim 1, wherein said pressure sensing assembly is coupled to said valve stem.

7. The valve, as set forth in claim 1, wherein said pressure sensing assembly comprises:

a bellows assembly disposed in said housing portion in cooperating relationship with said valve stem, said bellows assembly having a biasing member that biases said valve stem into said second position, said bellows assembly creating movement of said valve stem toward said first position in response to fluid pressure in said interior region of said housing compressing said biasing member.

8. The valve, as set forth in claim 1, wherein said pressure sensing assembly comprises:

a diaphragm disposed in said housing portion in cooperating relationship with said valve stem, said diaphragm causing movement of said valve stem toward said first position in response to fluid pressure in said interior region of said housing moving said diaphragm in a first direction, and said diaphragm causing movement of said valve stem toward said second position in response to fluid pressure in said interior region moving said diaphragm in a second direction.

9. A valve setting the dampening level of a fluid-filled strut, said strut having a cylinder and having a piston slidably disposed for axial movement within said cylinder and forming an annulus therebetween, said piston having an interior chamber and a passageway fluidically coupling fluid in said interior chamber to fluid in said annulus, said valve comprising:

a valve body having a first end portion and a second end portion, and having an orifice between said first end portion and said second end portion, said first end portion being configured to be coupled to said passageway of said piston and said second end portion having a housing portion, said housing portion having a port that fluidically couples an interior region of said housing portion with said interior chamber of said piston, said port configured to filter transient pressure fluctuations and to transmit steady-state pressure fluctuations originating in said interior chamber of said piston;

a valve stem disposed within said valve body proximate said orifice, said valve stem being axially movable between a first position in which said valve stem covers said orifice and a second position in which said valve stem uncovers said orifice; and a bellows assembly disposed in said housing portion in cooperating relationship with said valve stem, said bellows assembly having a biasing member that biases said valve stem into said second position, said bellows assembly producing movement of said valve stem toward said first position in response to fluid pressure in said interior region of said housing compressing said biasing member.

10. The valve, as recited in claim 9, wherein said bellows assembly further comprises:

a plate being coupled to said biasing member, said plate being fluidically sealed against said interior region of said housing so that fluid pressure communicated through said port forces said plate against said biasing member.

11. The valve, as recited in claim 9, wherein said bellows assembly further comprises:
an aperture through which the bias of said bellows assembly can be set to control the strut load level at which said valve stem is moved between said first and second positions.

12. The valve, as recited in claim 9, further comprising:
a return spring axially disposed in said first end portion of said valve body to bias said valve stem toward said first position.

13. The valve, as recited in claim 9, wherein said bellows assembly is coupled to said valve stem.

14. The valve, as recited in claim 9, wherein said port has an elongated conduit slidably mounted therein, said conduit being movable in response to the direction of fluid flow into or out of said interior region for reducing port blockages due to contaminants in the fluid.

15. A strut having adjustable dampening level capacity, said strut comprising:
a cylinder having an open end portion and an enclosed end portion;
a piston having a first end portion, a second end portion, and an interior chamber, said first end portion of said piston being telescopically interfitted and slidably mounted within said cylinder defining therebetween a fluid filled annulus, said first end portion of said piston being configured to form a slidable seal between said piston and said cylinder, said piston having a radial passageway that fluidically couples said annulus to said interior chamber;
a check valve providing a unidirectional fluid flow path from said interior chamber to said annulus,
a secondary throttling conduit fluidically coupling said annulus and said interior chamber;
a valve body having a first end portion and a second end portion, and having an orifice between said first end portion and said second end portion, said first end portion being configured to be coupled to said passageway of said piston and said second end portion having a housing portion, said housing portion having a port that fluidically couples an interior region of said housing portion with said interior chamber of said piston; a valve stem disposed within said valve body proximate said orifice, said valve stem being axially movable between a first position in which said valve stem covers said orifice and a second position in which said valve stem uncovers said orifice;
a pressure sensing assembly disposed in said housing portion and positioned in cooperating relationship to said valve stem, said pressure sensing assembly causing movement of said valve stem toward said first position in response to fluid pressure in said interior region of said housing moving said pressure sensing assembly in a first direction.

16. The strut, as set forth in claim 15, wherein said port is configured to filter transient pressure fluctuations and to transmit steady-state pressure fluctuations originating in said interior chamber of said piston.

17. The strut, as recited in claim 15, wherein said port has an elongated conduit slidably mounted therein, said conduit being movable in response to the direction of fluid flow into or out of said interior region for reducing port blockages caused by contaminants in the fluid.

18. The strut, as set forth in claim 15, further comprising:
a spring being disposed in said valve body in contact with said valve stem, said spring biasing said valve stem toward said toward said first position.

19. The strut, as set forth in claim 18, wherein said pressure sensing assembly comprises:
a biasing member contacting said valve stem and biasing said valve stem toward said second position wherein said biasing member forces said valve stem into said second position against the bias of said spring until fluid pressure in said interior region of said housing moves said biasing member in said first direction so that said spring forces said valve stem into said first position.

20. The valve, as set forth in claim 15, wherein said pressure sensing assembly is coupled to said valve stem.

21. The valve, as set forth in claim 15, wherein said pressure sensing assembly comprises:
a bellows assembly disposed in said housing portion in cooperating relationship with said valve stem, said bellows assembly having a biasing member that biases said valve stem into said second position, said bellows assembly creating movement of said valve stem toward said first position in response to fluid pressure in said interior region of said housing compressing said biasing member.

22. The valve, as set forth in claim 15, wherein said pressure sensing assembly comprises:
a diaphragm disposed in said housing portion in cooperating relationship with said valve stem, said diaphragm causing movement of said valve stem toward said first position in response to fluid pressure in said interior region of said housing moving said diaphragm in a first direction, and said diaphragm causing movement of said valve stem toward said second position in response to fluid pressure in said interior region moving said diaphragm in a second direction.

23. A valve setting the dampening level of a fluid-filled strut, said strut having a cylinder and having a piston, said piston being slidably disposed for axial movement within said cylinder and forming an annulus therebetween, said piston having an interior chamber and a passageway fluidically coupling fluid in said interior chamber to fluid in said annulus, said valve comprising:
a valve body having a first end portion and a second end portion, and having an orifice between said first end portion and said second end portion, said first end portion being configured to be coupled to said passageway of said piston and said second end portion having a housing portion, said housing portion having a port that fluidically couples an interior region of said housing portion with said interior chamber of said piston, said port having an elongated conduit slidably mounted therein, said conduit being movable in response to the direction of fluid flow into or out of said interior region for reducing port blockages caused by contaminants in the fluid;
a valve stem disposed within said valve body proximate said orifice, said valve stem being movable between a first position in which said valve stem covers said orifice and a second position in which said valve stem uncovers said orifice; and
a pressure sensing assembly disposed in said housing portion and positioned in cooperating relationship to said valve stem, said pressure sensing assembly causing the movement of said valve stem toward said first position in response to fluid pressure in said interior region of said housing moving said pressure sensing assembly in a first direction.

24. A valve setting the dampening level of a fluid-filled strut, said strut having a cylinder and having a piston, said piston being slidably disposed for axial movement within said cylinder and forming an annulus therebetween, said piston having an interior chamber and a passageway fluidically coupling fluid in said interior chamber to fluid in said annulus, said valve comprising:
   a valve body having a first end portion and a second end portion, and having an orifice between said first end portion and said second end portion, said first end portion being configured to be coupled to said passageway of said piston and said second end portion having a housing portion, said housing portion having a port that fluidically couples an interior region of said housing portion with said interior chamber of said piston;
   a valve stem disposed within said valve body proximate said orifice, said valve stem being movable between a first position in which said valve stem covers said orifice and a second position in which said valve stem uncovers said orifice;
   a spring being disposed in said valve body in contact with said valve stem, said spring biasing said valve stem toward said first position;
   a pressure sensing assembly disposed in said housing portion and positioned in cooperating relationship to said valve stem, said pressure sensing assembly causing movement of said valve stem toward said first position in response to fluid pressure in said interior region of said housing moving said pressure sensing assembly in a first direction; and
   wherein said pressure sensing assembly comprises a biasing member contacting with valve stem and biasing said valve stem toward said second position wherein said biasing member forces said valve stem into said second position against the bias of said spring until fluid pressure in said interior region of said housing moves said biasing member in said first direction so that said spring forces said valve stem into said first position.

25. A valve setting the dampening level of a fluid-filled strut, said strut having a cylinder and having a piston, said piston being slidably disposed for axial movement within said cylinder and forming an annulus therebetween, said piston having an interior chamber and a passageway fluidically coupling fluid in said interior chamber to fluid in said annulus, said valve comprising:
   a valve body having a first end portion and a second end portion, and having an orifice between said first end portion and said second end portion, said first end portion being configured to be coupled to said passageway of said piston and said second end portion having a housing portion, said housing portion having a port that fluidically couples an interior region of said housing portion with said interior chamber of said piston;
   a valve stem disposed within said valve body proximate said orifice, said valve stem being movable between a first position in which said valve stem covers said orifice and a second position in which said valve stem uncovers said orifice; and
   a pressure sensing assembly disposed in said housing portion and positioned in cooperating relationship to said valve stem, said pressure sensing assembly causing the movement of said valve stem toward said first position in response to fluid pressure in said interior region of said housing moving said pressure sensing assembly in a first direction,
   wherein said pressure sensing assembly comprises a bellows assembly disposed in said housing portion in cooperating relationship with said valve stem, said bellows assembly having a biasing member that biases said valve stem into said second position, said bellows assembly creating movement of said valve stem toward said first position in response to fluid pressure in said interior region of said housing compressing said biasing member.

26. A valve setting the dampening level of a fluid-filled strut, said strut having a cylinder and having a piston, said piston being slidably disposed for axial movement within said cylinder and forming an annulus therebetween, said piston having an interior chamber and a passageway fluidically coupling fluid in said interior chamber to fluid in said annulus, said valve comprising:
   a valve body having a first end portion and a second end portion, and having an orifice between said first end portion and said second end portion, said first end portion being configured to be coupled to said passageway of said piston and said second end portion having a housing portion, said housing portion having a port that fluidically couples an interior region of said housing portion with said interior chamber of said piston;
   a valve stem disposed within said valve body proximate said orifice, said valve stem being movable between a first position in which said valve stem covers said orifice and a second position in which said valve stem uncovers said orifice; and
   a pressure sensing assembly disposed in said housing portion and positioned in cooperating relationship to said valve stem, said pressure sensing assembly causing movement of said valve stem toward said first position in response to fluid pressure in said interior region of said housing moving said pressure sensing assembly in a first direction,
   wherein said pressure sensing assembly comprises a diaphragm disposed in said housing portion in cooperating relationship with said valve stem, said diaphragm causing movement of said valve stem toward said first position in response to fluid pressure in said interior region of said housing moving said diaphragm in a first direction, and said diaphragm causing movement of said valve stem toward said second position in response to fluid pressure in said interior region moving said diaphragm in a second direction.

27. A strut having an adjustable dampening level, said strut comprising:
   a cylinder;
   a piston slidably mounted within said cylinder and defining an annulus therebetween, said piston having an interior chamber and a radial passageway that fluidically couples said annulus to said interior chamber; and
   a valve fluidically coupling said annulus to said interior chamber of said piston and controlling the flow of fluid therebetween, said valve comprising:

a valve body having a first end portion, a second end portion, and an orifice between said first end portion and said second end portion, said first end portion being positioned in said passageway of said piston and said second end portion having a housing portion, said housing portion having an interior region and a port that fluidically couples said interior region with said interior chamber of said piston;

a valve stem disposed within said valve body proximate said orifice, said valve stem being movable between a first position in which said valve stem covers said orifice and a second position in which said valve stem uncovers said orifice; and a pressure sensing assembly disposed in said housing portion and positioned in cooperating relationship with said valve stem, said pressure sensing assembly being movable in a first direction in response to fluid entering said interior region of said housing through said port and increasing the fluid pressure in said interior region;

whereby said pressure sensing assembly controls the movement of said valve stem toward said first position in response to fluid entering said interior region of said housing through said port and increasing the fluid pressure in said interior region such that said pressure sensing assembly moves in said first direction.

28. The strut of claim 27, wherein said valve has a spring member disposed in said valve body in contact with said valve stem, said spring member biasing said valve stem toward said first position; and wherein said pressure sensing assembly comprises a biasing member that biases said valve stem into said second position against the bias of said spring member;

whereby said valve stem is moved into said first position in response to fluid entering said interior region of said housing through said port and increasing the fluid pressure in said interior region such that said pressure assembly moves in said first direction and said spring member forces said valve stem into said first position.

* * * * *

UNITED STATES PATENT AND TRADEMARK OFFICE
CERTIFICATE OF CORRECTION

PATENT NO. : 5,346,042
DATED : September 13, 1994
INVENTOR(S) : Paskus

It is certified that error appears in the above-identified patent and that said Letters Patent is hereby corrected as shown below:

Column 4, line 42, "of-the" should be -- of the --.

Column 5, line 45 (claim 1), before "pressure", insert -- a --.

Column 9, line 39 (claim 24), delete "with".

Column 9, line 39, before "valve", insert -- said --.

Signed and Sealed this

Fifteenth Day of November, 1994

Attest:

BRUCE LEHMAN

*Attesting Officer*     *Commissioner of Patents and Trademarks*